Figure 1:
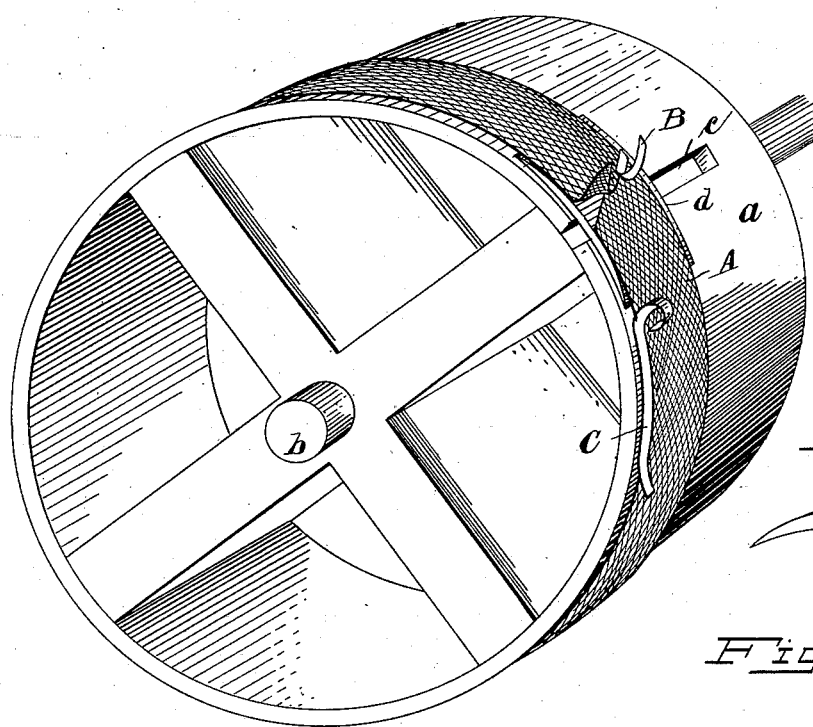
Figure 1A:
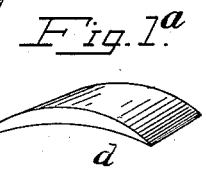

No. 654,900. Patented July 31, 1900.
G. KNADLER.
METHOD OF FORMING PNEUMATIC TIRES.
(Application filed Oct. 2, 1899.)
(No Model.) 4 Sheets—Sheet 1.

WITNESSES
C. Johnson
A. Nahannah

INVENTOR
Godfrey Knadler
By L. M. Thurlow,
ATTY.

No. 654,900. Patented July 31, 1900.
G. KNADLER.
METHOD OF FORMING PNEUMATIC TIRES.
(Application filed Oct. 2, 1899.)
(No Model.) 4 Sheets—Sheet 2.
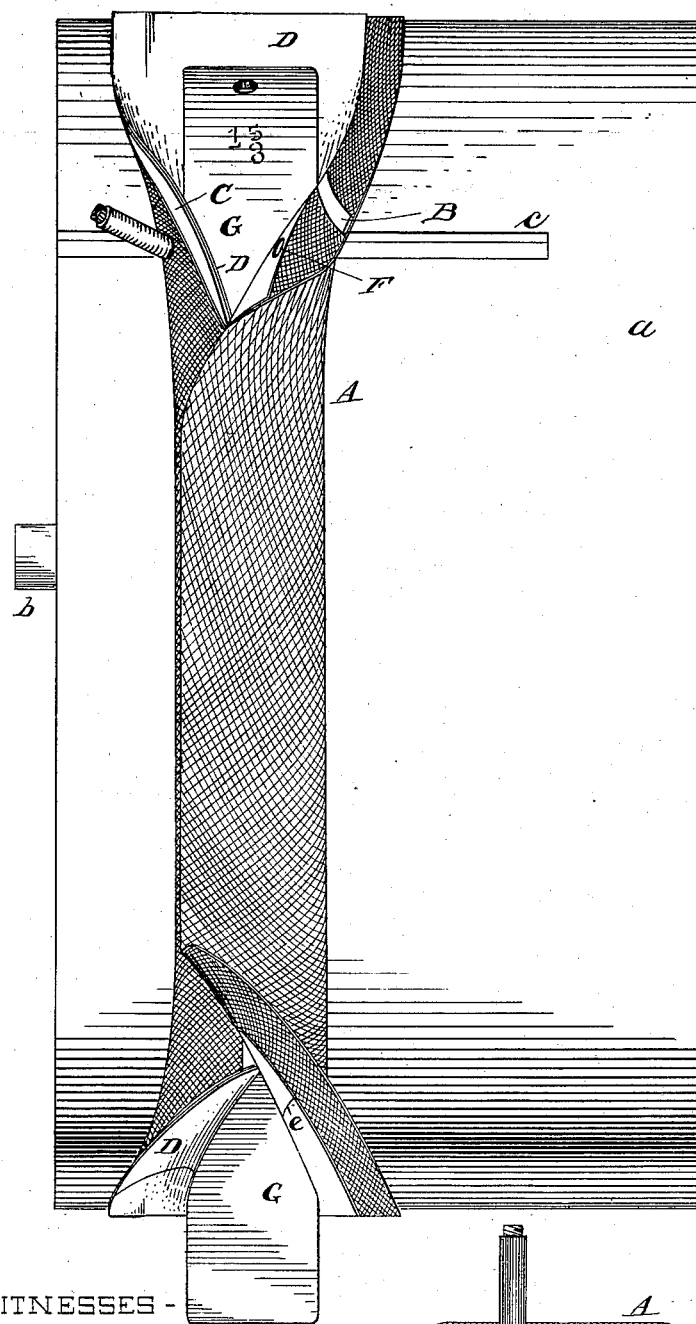
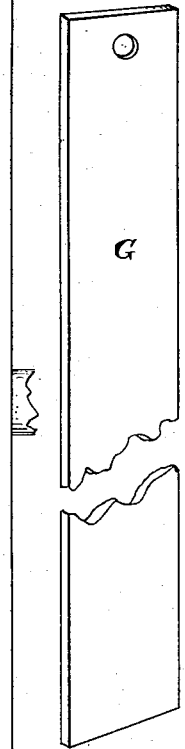
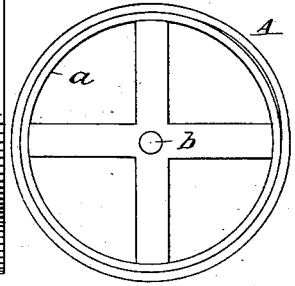
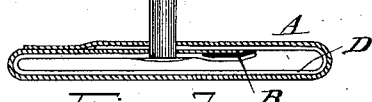
WITNESSES —
C. Johnson
H. Mahannah
INVENTOR
Godfrey Knadler
By L. M. Thurlow
ATTY.

No. 654,900. Patented July 31, 1900.
G. KNADLER.
METHOD OF FORMING PNEUMATIC TIRES.
(Application filed Oct. 2, 1899.)
(No Model.) 4 Sheets—Sheet 3.
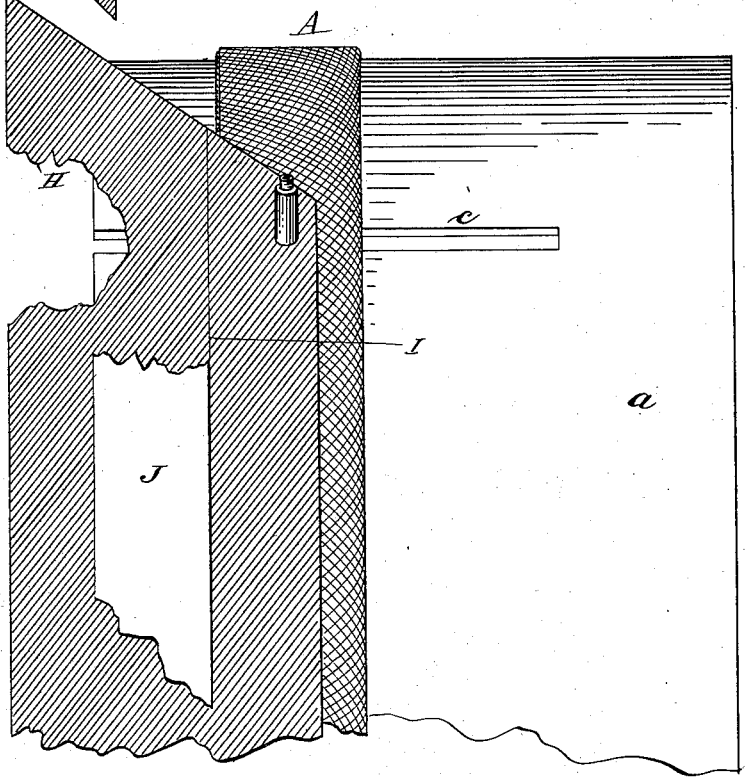
WITNESSES-
C. Johnson
H. Onahannah
INVENTOR
Godfrey Knadler
By L. M. Thurlow,
ATTY.

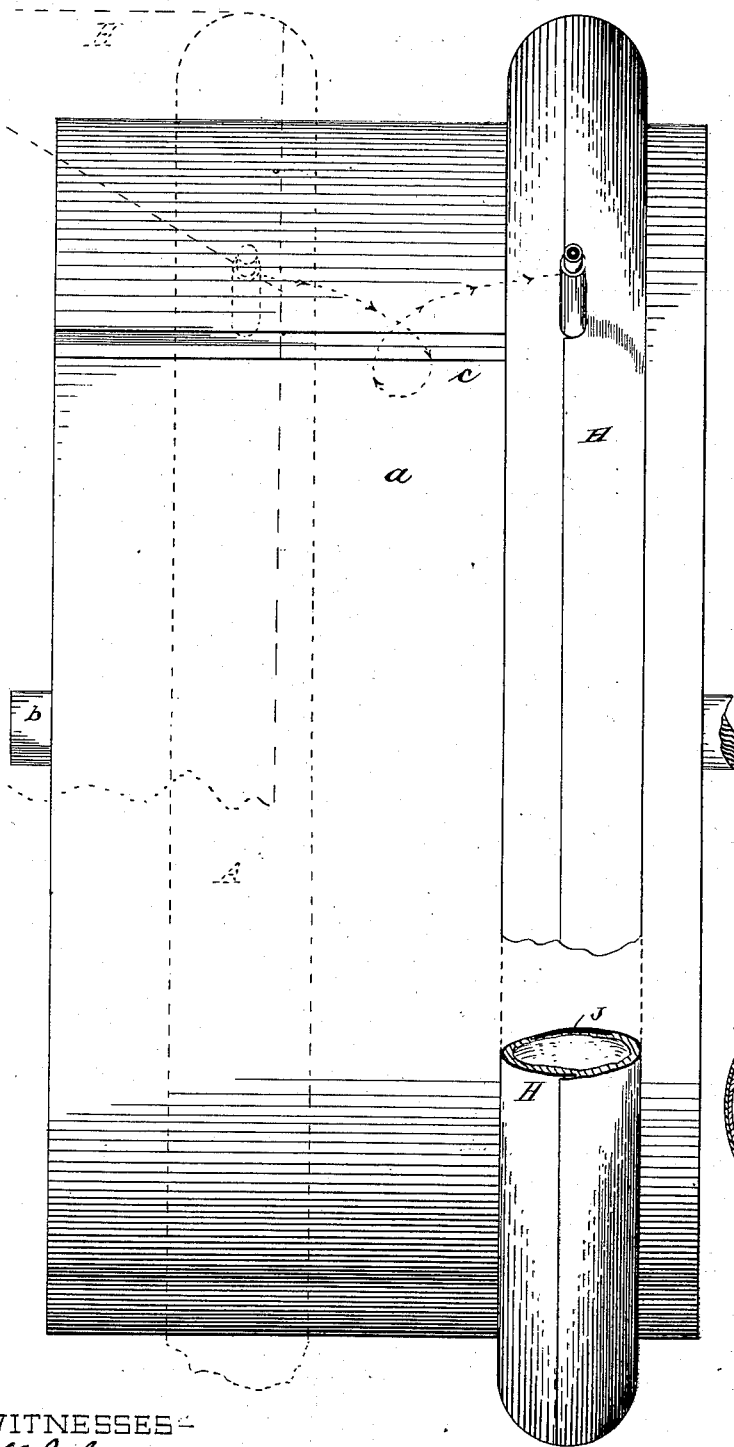
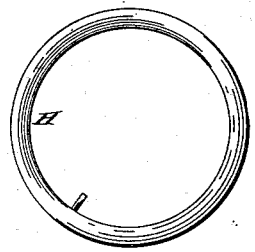
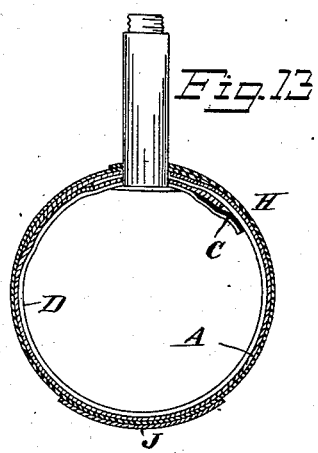
No. 654,900. Patented July 31, 1900.
G. KNADLER.
METHOD OF FORMING PNEUMATIC TIRES.
(Application filed Oct. 2, 1899.)
(No Model.) 4 Sheets—Sheet 4.
Fig. 11.
Fig. 12.
Fig. 13.
WITNESSES—
INVENTOR
Godfrey Knadler
By L. M. Thurlow
ATTY.

UNITED STATES PATENT OFFICE.

GODFREY KNADLER, OF PEORIA, ILLINOIS, ASSIGNOR OF SEVEN-EIGHTHS TO ALTON G. SEIBERLING AND CHARLES J. BUTLER, OF SAME PLACE.

METHOD OF FORMING PNEUMATIC TIRES.

SPECIFICATION forming part of Letters Patent No. 654,900, dated July 31, 1900.

Application filed October 2, 1899. Serial No. 732,302. (No model.)

*To all whom it may concern:*

Be it known that I, GODFREY KNADLER, a citizen of the United States, residing at Peoria, in the county of Peoria and State of Illinois, have invented certain new and useful Improvements in Methods of Forming Pneumatic Tires; and I do hereby declare that the following is a full, clear, and exact description of the invention, which will enable others skilled in the art to which it appertains to make and use the same.

This invention pertains to pneumatic tires and method for constructing the same.

The object of the present invention is to make a practically endless tire, or, in other words, the object is to so construct a tire that there will be no point in its length that can become weakened or break under pressure of the air contained therein or by the rider's weight.

Furthermore, the object is to employ a method of construction that will be cheaper, require less time in the manufacture of the tire, and need the attention of only one workman in the operation.

Ordinarily tires of this class are made in straight lengths—as, for instance, in making hose-pipe. These lengths are then telescoped into each other at the ends or by means of an interior or exterior bushing, which forms a connection between the ends. As is well known, the time required in making these tires, the expensive machinery necessary, and the various hands through which the tire must pass in its various phases make the tire expensive. Furthermore, when such tires are put on the road and subjected to the various degrees of pressure and wear that they must inevitably encounter they very often break at the joined ends, be they ever so carefully connected. Knowing these facts as I do the tire hereinafter described and the process for constructing it have been devised.

Figures 2, 3:
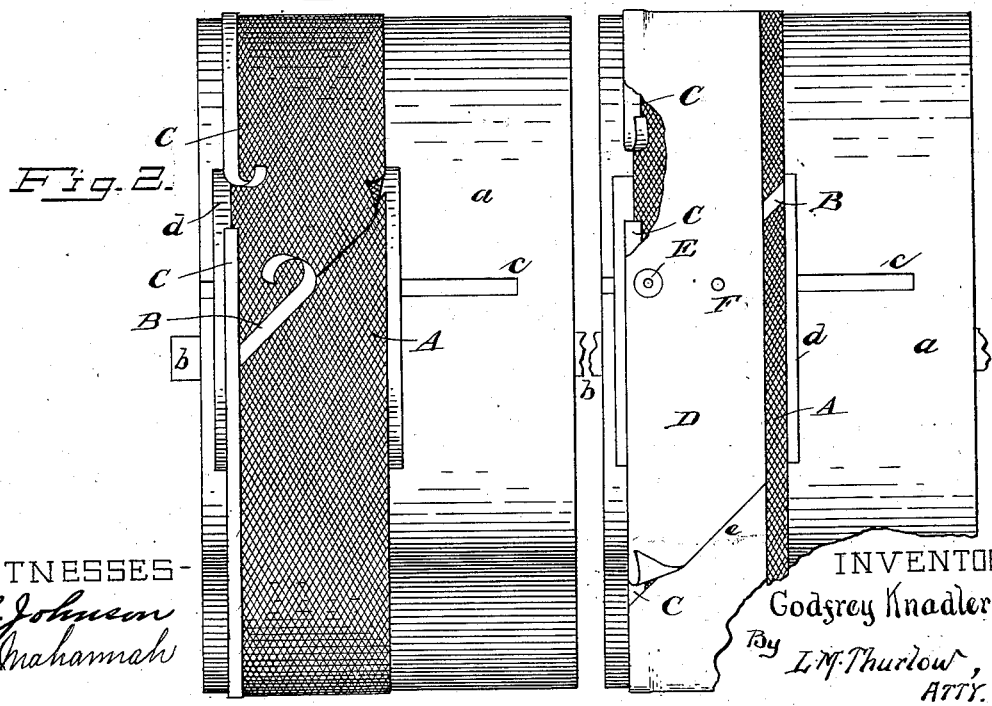

In the appended drawings, Figure 1 is a perspective view of a drum or former upon which the tire is built, showing a rubber fabric portion spread thereon. Fig. 1ª shows a pad used between the drum or pulley and the tire while the latter is being made. Fig. 2 is a face view of the pulley or drum, showing same material spread thereon as shown in Fig. 1. Fig. 3 is the same, but showing a rubber strip superimposed on the fabric. Fig. 4 is the same as Fig. 3, but enlarged to better show the tire portion and the method of forming same into a tube. Fig. 5 is a perspective view of a portion of a core or former used in the operation shown in Fig. 4. Fig. 6 is a side view of the pulley or drum shown in the preceding figures, with a space left between the pulley and tire occasioned by the pad shown in Fig. 1ª. Fig. 7 is a cross-section of the partially-finished tire. Fig. 8 shows the tire as it appears after being folded together in the manner indicated in Fig. 4 while still on the pulley. Fig. 9 is a strip of fabric which is applied to the tire after it is formed as in Fig. 8. Fig. 10 is the pulley and tire, showing the fabric, Fig. 9, being applied thereto. Fig. 11 is a view of the pulley-face and the tire inflated in dotted lines with the fabric, Figs. 8 and 10, showing position of the completed tire in full lines. Fig. 12 is a view of the completed tire, and Fig. 13 is a cross-section of the same.

In the several figures, $a$ is a pulley or drum mounted on a suitable stud $b$ and free to turn thereon. Such pulley is slotted across the greater part of its face at $c$ to permit the entrance and exit of the valve-stem of the tire during the several manipulations of the latter. Upon the pulley's face, covering the slot $c$, is a pad $d$, upon which the tire is laid in passing around the pulley, as shown in Figs. 1, 2, and 3.

The first operation in making the tire consists in employing a strip A of what is known to the trade as "friction fabric," which consists of canvas covered or filled with crude rubber to make it "tacky" as well as for vulcanizing purposes. Such strip is cut at an angle at each end, and, for example, is started at the pad $d$ and laid entirely around the face of the pulley, the opposite end being overlapped upon the starting end and struck down by means of the rubber coating referred to. Then a strip of rubber B is placed over the angling joint of the fabric, as at Figs. 1, 2, and 3, which, in addition to the adhesive quality of the fabric, serves to keep the ends together and at the same time precludes the possibility of the edges of the fabric wearing on the air-tube portion to follow. One edge of the fabric is also covered by a strip of rubber C for the same purpose as above described. The second important step consists in laying upon the fabric A a strip of rubber D, the ends of which are also cut at an angle much in the same manner as the said fabric, the ends being overlapped, as shown in Fig. 3 at e, and one edge thereof is laid flush, or substantially so, with the outer edge of the strip C. The latter thus protects the strip D from the edge of fabric A, as is obvious. The strip D does not cover the fabric A entirely; but this is not important. The only requisite, however, is that the rubber strip D must be wide enough to overlap itself when folded into tubular form. The valve-stem is now inserted at E by merely using a hollow punch or other suitable implement and making an aperture through the fabric A and the rubber strip D at the point desired, through which the stem is inserted. The rubber disk, at the base of the stem, is merely pressed firmly down onto the rubber, to which it adheres. An aperture F is made opposite the stem and is placed over such stem in the next operation. Fig. 4 shows the tire when constructed as described and the manner of forming same into a tube. The rubber strip D is the air-container when completed, as will be presently understood. I next fold one edge of the tire over the other, as indicated in Fig. 4, and accomplish this by employing a core G, Fig. 5, which I place at about the middle of the rubber strip and then fold over the edge having the strip C thereon. This brings the valve-stem uppermost, and after this edge is completely turned the opposite one is folded over upon it, and the said stem is pushed through the aperture F. When the latter edge is turned, it is firmly pressed down upon the material beneath it and the two portions adhere perfectly. It may be said in passing that before the folding process is undergone the rubber strip D is dusted with soapstone or like material to prevent adhesion of the parts during the several manipulations. It will be seen that the right-hand edge of the rubber strip D and fabric A extends to the left beyond the strip C and adheres to the outside surface of the said fabric A. The cross-sectional view Fig. 7 shows this, wherein D is shown devoid of cross-hatching to give contrast to the parts. It is observed that the core G sizes the tire, or, in other words, is of such a cross-section as to make the tire when snugly folded around it of a definite predetermined size and, as a matter of course, makes the tire of a uniform cross-section throughout its entire length. As the tire is folded along its length the core is gradually pulled out and drawn farther along on the still open portions until at last only a small opening is left, as at Fig. 8. Through this the core is withdrawn and the said opening is folded over without the core while still on the pulley, though said figure shows the tire removed. Next, the tire so formed is ready for a final outer fabric covering H, which consists of a strip of friction fabric cut at an angle at each end and perforated at one point near the edge to pass over the valve-stem and marked or scored at D as a guide for a reinforcing-strip J. Said fabric H is located about as shown in Fig. 10 as regards its edge and is continued entirely around the tire and lapped, as already described. The line I merely forms a guiding-line for said strip J, as above outlined, in order that the latter may be evenly attached. This operation is undertaken after the edge of the fabric is placed as shown in said Fig. 10, after which the tire is inflated partially and appears then as in Fig. 11 in broken lines. Just here may be explained the use of the pad d shown in the first four figures of the drawings. Its purpose, as well as that of covering the slot c and forming a solid base to work on, is primarily to slightly lengthen the tire, so that when such pad is removed and the tire inflated, as described, the natural shortening of the latter at the drum, due to such inflation, will not be sufficient to cause the tire to grip the pulley, and it can therefore be easily moved thereon. The flat sheet of fabric H, which has been carried around the tire and adhered at its edge, is now completely and at one movement wrapped upon the inflated tube by merely rolling the latter to the position shown at the right of Fig. 11 in full lines. In reaching this position the tire has turned inside out—that is to say, it has turned a complete revolution laterally—carrying the valve-stem down through the slot c in the pulley and out again in a gyrating motion, as indicated by the darts, to the position mentioned. During this movement the fabric has been laid on thoroughly free of wrinkles, the outer edge reaching beyond the inner one, but remaining at the base of the tire. The completed tire is shown in Fig. 12, a cross-section being shown in Fig. 13, in which the reinforced strip J is shown on the tread and the various layers in their relative positions. When removed from the pulley and vulcanized in the usual way, the tire is ready for use.

While I have described in detail the various maneuvers in making the tire, I desire to state that I may use other means of accomplishing the ends sought. I may not use the rubber strips B and C at the end joints and the edge of the fabric A, though their use is attended with possibly better results. The exact position or width of the rubber strip D is not important, but the proportion shown is convenient and answers every purpose. I have shown the ends of the fabric A cut at an angle, but I do not intend to limit myself to that particular form. The points of division in the several strips are separated from each other and are preferably distributed around the tire, so that no two joints will coincide. I desire to make it fully understood that in making the tire by lapping the ends of the various layers a practically-endless tube is formed, since after vulcanizing the joints are thoroughly sealed and made as strong as any uncut portion thereof. Various sizes of the tire may be constructed by using cores of varying cross-section. As much reinforcing material may be added to the strip H before it is rolled upon the tire as is desired to make a longer-lasting tire and one less easily punctured, and, on the other hand, none need be used when a racing-tire is wanted. Obviously, the fabric A and rubber strip B may be laid on one another before forming the tire on the drum. Thus I am not limited to any fixed method of making such tire. The making of tires by my method is really more simple and more easily done than the description here given would imply, and the tire produced is as perfect as can be made. The expensive machinery and experienced help usually necessary in making pneumatic tires are rendered wholly unnecessary. A novice can make a complete and perfect tire as well as an expert, and the time consumed is much less than by the older processes. Furthermore, the maker of the tire is responsible individually for the work he performs, whereas heretofore where several workers were necessary in completing a tire a fault found in the completed article could not be traced to the proper person with certainty.

I am not aware of a tire constructed as mine is, nor do I know of a method such as I describe for making a tire of the character described.

Having described my invention, I claim—

1. The herein-described method of forming tires which consists in spreading a strip of suitable tire fabric in circumferential form, uniting the ends thereof, superimposing a strip of rubber upon the fabric strip, folding the edges of one over the other to form a tube, substantially as set forth, then attaching a second fabric strip to the tube and finally rolling the tube along the drum to cause the fabric to adhere to it for the purposes set forth.

2. The herein-described method of forming tires of the character described which consists in spreading a strip of suitable fabric circumferentially, uniting the ends thereof, superimposing on said fabric a strip of rubber, uniting the ends of the latter, folding the parallel edges of the united fabric and rubber one over the other to form a tube, substantially as described, attaching a second fabric strip to the tube thus constructed, then partially inflating the tube and rolling same upon the drum to wrap the fabric upon it and finally vulcanizing the finished tire.

3. The herein-described method of forming tires of the character described which consists in spreading a strip of suitable fabric circumferentially upon a drum, or former, uniting the ends thereof, covering the joint formed thereby with a protecting-strip, covering one edge thereof also with a protecting-strip, superimposing a strip of rubber upon said fabric substantially as set forth, folding the latter edge over, folding the opposite edge over upon that to form a tube, then attaching a second fabric covering to the tube and lastly vulcanizing the tire.

4. The herein-described method of constructing pneumatic tires which consists in first spreading a strip of fabric in circumferential form, uniting the ends thereof, superimposing a strip of rubber upon such fabric, uniting the ends thereof, folding the parallel edges of the united strips over to form a tube and finally applying a fabric covering to the tube and vulcanizing the finished product.

5. The method of forming pneumatic tires which consists in connecting the two ends of a strip of fabric, forming the body of the tire, such strip having adhered thereto a strip of rubber also united at its ends, the latter to form an air-container for the finished tire, folding one of the circumferential edges of each of the strips thus adhered over their other edges to form a tube and finally vulcanizing the tube so formed.

6. A method of forming pneumatic tires consisting in arranging a strip of tire fabric to form a ring, uniting its ends, adhering a strip of rubber to the outer surface thereof, uniting the ends thereof and lastly folding a circumferential edge of both the fabric strip and rubber strip over upon their opposite edges to form a tube for the purposes set forth.

7. A method of forming pneumatic tires consisting in arranging a strip of tire fabric to form a ring at its ends, adhering to the outer surface thereof a strip of rubber, uniting the ends of the latter, folding a circumferential edge of the fabric and rubber strip one over the other to form a tube and finally attaching a fabric strip to the tube thus formed and spreading it around the same and finally vulcanizing the product.

8. The herein-described method of forming pneumatic tires which consists in connecting the ends of united strips of fabric and rubber, overlapping the longitudinal edges thereof to form a tube, covering the tube with a final protecting-strip, uniting the latter at its ends and overlapping its longitudinal edges all substantially as described and finally vulcanizing the finished tire for the purposes set forth.

9. A method of forming pneumatic tires consisting in connecting the ends of a strip of rubber-coated fabric to form a circular band adhering a strip of rubber to the outer surface of the fabric and overlapping its ends substantially as set forth to form an air-container in the finished tire, then folding the edges of the united fabric and rubber over upon each other to form a complete endless tube and finally vulcanizing the same.

10. A method of forming pneumatic tires consisting in forming a band, or ring, with the elements comprising the tire, uniting the ends and edges thereof to form an endless tube adhering an outer protecting-covering thereto by partially inflating the tire and rolling it upon a band of covering fabric to cause the same to entirely cover it as described and finally vulcanizing the finished tire.

In testimony whereof I affix my signature in presence of two witnesses.

GODFREY KNADLER.

Witnesses:
S. Q. CASSELL,
GEO. W. SEIBERLING.